Aug. 29, 1967    R. FAVRE    3,339,133
SELF-COMMUTATED, OSCILLATOR-FED MOTOR SYSTEM
Filed Dec. 10, 1965    4 Sheets-Sheet 4

United States Patent Office 3,339,133
Patented Aug. 29, 1967

3,339,133
SELF-COMMUTATED, OSCILLATOR-FED
MOTOR SYSTEM
Robert Favre, Lausanne, Switzerland, assignor to Golay,
Buchel & Cie S.A., Lausanne-Malley, Switzerland
Filed Dec. 10, 1965, Ser. No. 512,979
10 Claims. (Cl. 318—138)

This application is in part a continuation of my previous application Ser. No. 58,763 filed Sept. 27, 1960 and now abandoned.

This invention relates to self-commutated motors.

A D.C. motor has already been proposed having commutating means which operates without any actual contact, this motor including a magnetised rotor surrounded by a magnetisable stator structure and being provided with a control fed through a D.C. supply and a transistor so that the control winding lies in the base circuit of the transistor. Upon rotation of the magnetised rotor, pulses are induced in the control winding which set the transistor periodically in its conductive position and thereby supplies a feed to the energising winding of the stator structure and thus keeps the rotor rotating.

In this well-known electric motor there is the drawback that an intricate stator structure is necessary which must include, in addition to at least one energising winding, at least one control winding. Furthermore, with these motors the intensity of the induced pulses and thus the base current controlling the transistor and thereby the amplification provided by the transistor depends upon the speed of rotation of the rotor. In practice, it is possible to produce in accordance with such a principle only two-pole motors so that the curve of variations of the accelerating torque is extremely irregular since it is a function of the angular setting of the rotor.

On the other hand, a measuring technique has already been provided having arrangements which inductively operate on an indicating pointer and are associated with an oscillator transistor so that a metal foil moving in a common gap between two coupled windings modifies the operative condition of the oscillator to a varying extent and thus modifies the amplitude of the oscillations as a function of the coupling of the windings. Upon increase of the amplitude beyond a predetermined value a control or adjusting signal is released.

An object of the invention is to provide an improved commutatorless electric motor and the invention consists in a commutatorless electric motor supplied by an interrupted direct current and comprising a rotor made of ferromagnetic material, at least one periodically energised stator winding adapted to be fed from an electronic oscillator, a screen capable of being rotated by the rotor and adapted at certain rotary positions to modify the operative condition of the oscillator so that the oscillator is allowed to energize the stator winding when the magnetic field resulting therefrom can exert an accelerating torque on the rotor.

Another object of this invention is to provide a magnetic circuit for coupling the amplifier and the oscillator of a feed back loop circuit cooperating with the above-mentioned screen which effectively modifies the operating conditions of the oscillator so that it becomes oscillatory and non-oscillatory.

The objects of the present invention are realized as described below and with reference to the annexed drawing wherein.

Figure 3:
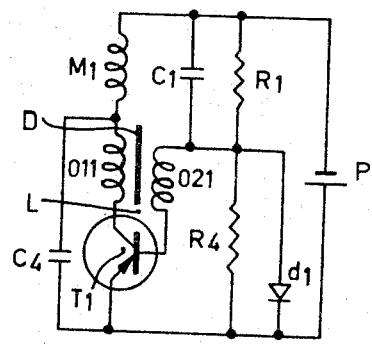
Figure 4:
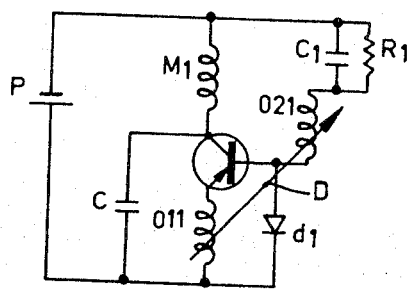

FIGURE 3 schematically illustrates one form of the oscillator component of the invention;

FIGURE 4 shows schematically an electronic oscillator circuit of the purely conductive type.

Figure 5:
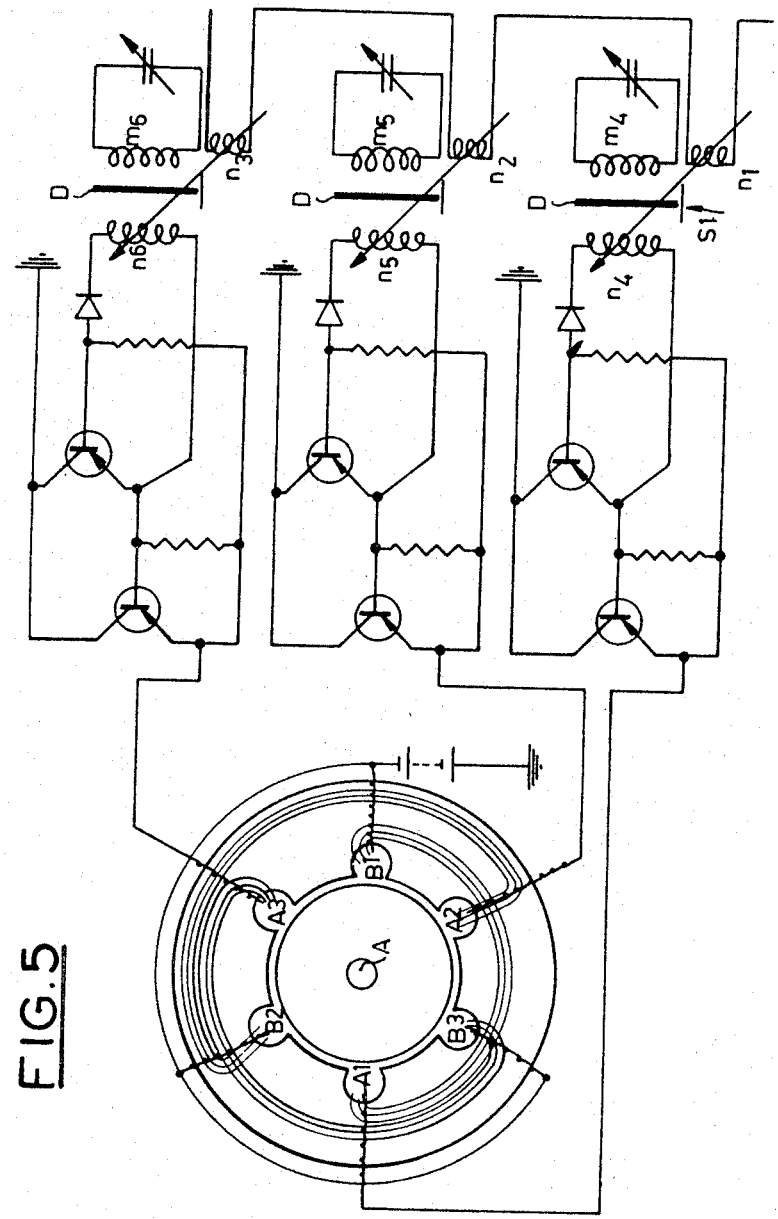

FIGURE 5 shows another three-phase motor constructed in accordance with the invention, together with a circuit diagram of the electronic commutator.

Figure 6:
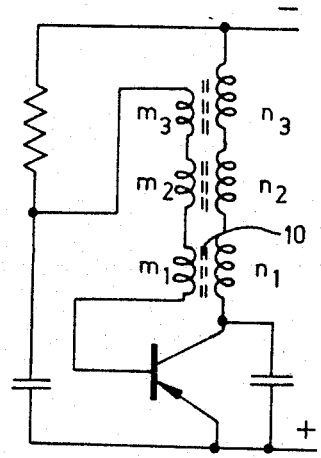

FIGURE 6 shows a circuit diagram for the high frequency feeding of the electronic commutators of the motor of FIGURE 5.

Figure 7:
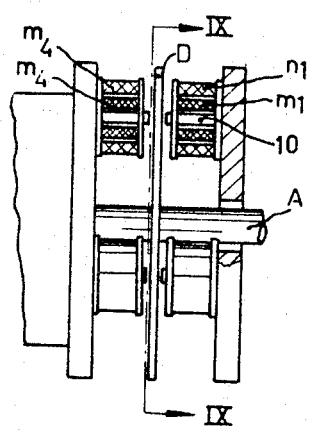

FIGURE 7 shows the coupling coils of the commutators according to FIGURE 5.

Figure 8:
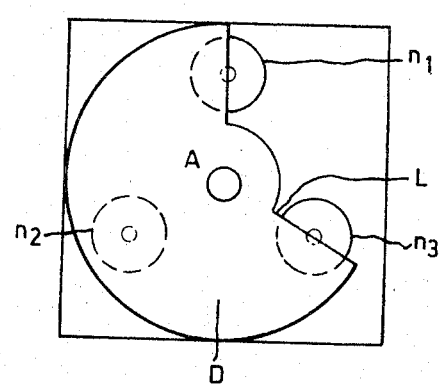

FIGURE 8 shows the top plane view of the area along the intersecting line IX—IX according to FIGURE 7.

Figure 1:
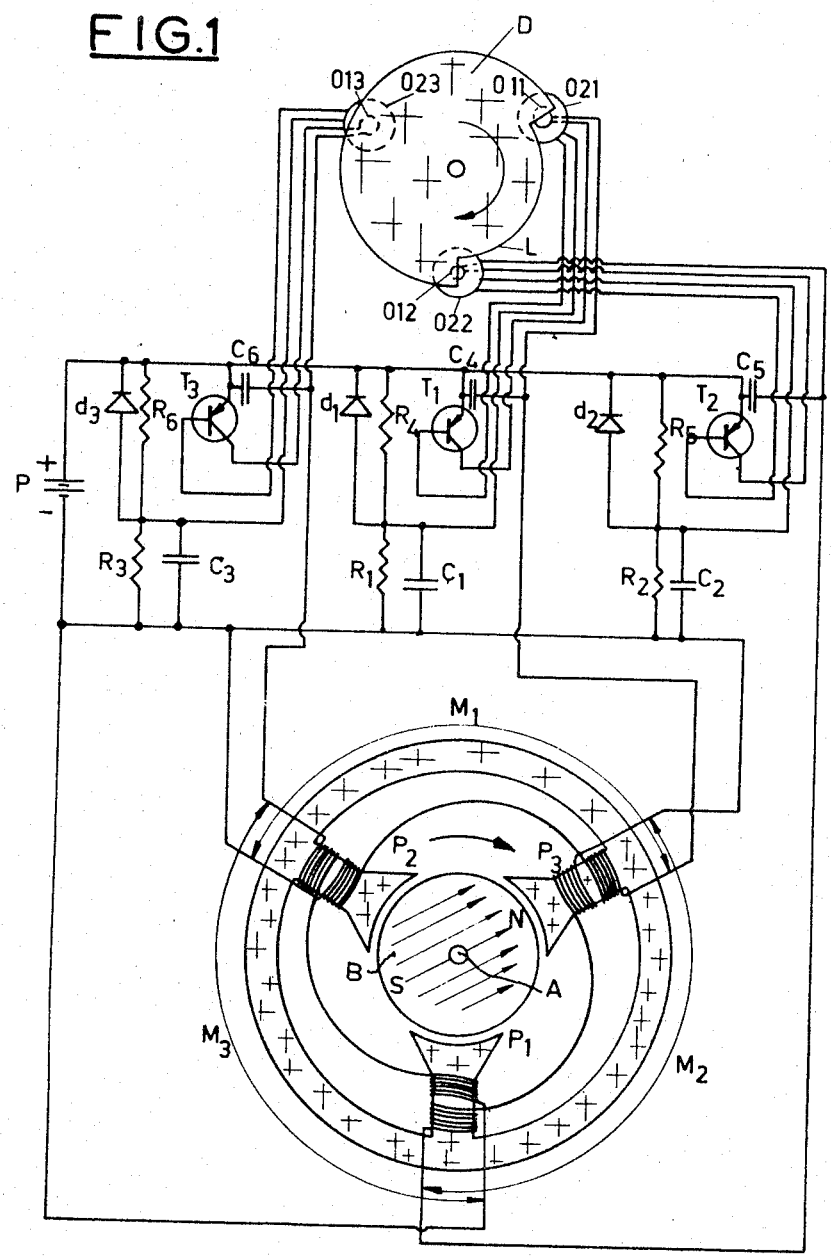
FIGURE 1 is a schematic illustration of one form of the claimed invention together with its electrical circuit.

Referring to FIGURE 1 there is shown a three-phase motor with three energising coils, M1, M2, M3, arranged symmetrically around the stator B with two poles common to any one winding. For each winding is provided an independent transistor circuit which excites each winding successively. The transistor oscillating circuit shown in FIGURE 1 for winding M1 includes a D.C. supply P such as a battery, a transistor T1 winding 011 and M1 in the collectors circuit of transistor T1, a condenser C4 inserted between the emitter and the tapping point of winding M1 in parallel with winding 011. Cooperating with winding 011 is the feed-back coil 021 in the base circuit of transistor T1 which is connected in parallel with a further condenser C1 and serves to give the base electrode of transistor T1 the bias voltage required for the self energising of the oscillator.

It is clear from the drawing that the other windings such as M2, M3, have corresponding parts, D2, etc. Diode D1 limits the loading of condenser C1 during the oscillation of the oscillator circuits. Resistance R4 in parallel with diode D1 aids in giving a desired bias voltage to the transistor base. Additionally diode D1 allows electrical energy released by switching off the oscillator to be returned to the supply of electrical energy. As shown a lead connects feed-pack coil 021 with winding M1, another lead connects the same coil with the emitter of transistor T1; still another lead connects the feed-back coil with the diode D1 and finally a last lead connects the same coil to the plate of transistor T1. Condenser C4 is a by-pass condenser in the circuit of the emitter of transistor T1 and coil 011. Thus condenser C4 and coil 011 form a resonance circuit.

The collectorless motor of the invention has a rotor B which is diametrically polarised in the manner shown by the arrows. As previously stated, the stator comprises three poles P1, P2 and P3 and has three windings M1, M2 and M3, so that each of the poles P1, P2 and P3 has two segments each belonging to two different windings. Again as stated before, windings M1, M2 and M3 belong to three oscillators. The driving element of the motor is formed by a disc which is secured in known manner, such as by keying and the like, to the shaft A of the rotor and which serves for the subsequent break in the three magnetic control circuits of the three said oscillators. Suitably these magnetic circuits consist, for example, of two co-axial interlocking coils, a magnetic core lying within the axis of these coils as well as an anchoring member which constitutes the magnetic ground. In FIGURE 1 of these three controlled coils only the inner ones 021, 022 and 023 are shown. Disc D has a slot L on its circumference which extends over an angle of 120°, so that by rotation of the disc D the interruption of the magnetic control circuit of one of the three oscillators is terminated and this oscillator is thus excited. Rotor B and disc D are so arranged above one another that the permanent magnet constituting rotor B by virtue of the periodic excitation of coils M1, M2 and M3 is attracted by in each case two of the poles P1, P2 or P3 and has thus imparted to it a constant moment of rotation which keeps it rotating on. Considering the moment at which the stator and rotor are shown on the drawing we note that the magnetic axis is parallel to pole P3. Immediately before reaching this position coil M1 was excited because the gap L covered completely coil pair 011 and 021 which control the excitation or energizing of winding M1. Considering further that the north pole of the rotor faces stator pole P3 the orientation of pole P3 was then south and pole P2 was the north pole. From this a torque moment ensues which rotated the rotor until it reached the position shown. At that point the energizing coils are switched by the disc so that winding M1 is switched off and winding M2 is switched on. P3 now becomes the north pole and P1 becomes the south pole. In this way a rotating torque is maintained. Thus the rotor B screen D and the coupling windings are arranged with reference to each other such that the permanent magnet forming the rotor B is attracted as a consequence of the periodic energisation of the windings M1, M2, M3, by successive pairs of poles P1, P2, P2, P3, P3, P1, whereby the motor is subjected to a permanent torque in a rotating field. There are no dead zones for the rotor so that consequently the rotor can start from every possible position at rest. That means that the claimed motor is self-starting whenever the oscillators are connected to the source of D.C. current.

Figure 2:
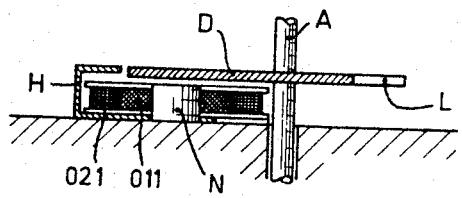
FIGURE 2 is a side view of the coupling coils.

The coupling coils provided for the oscillators are shown in FIGURE 2 for the oscillating circuit of coils 021 and 011. The windings 011 and 021 are arranged coaxially inside one another and carried by a common magnetic core. The closing of the magnetic field is ensured by a yoke H having a gap through which the disc D moves. Each time the notch L in the screen D registers with the core N of the windings 021 and 011, the corresponding oscillator and consequently the winding M1 are energised.

In the wiring diagram of FIGURE 3, the resistance R4 and the diode D1 are shown. The resistance R4 allows as desired a bias voltage for the transistor base, while the diode D1 limits the loading of the condenser C1 during the oscillation of the oscillator. Furthermore the diode D1 allows electrical energy released by the switching off of the oscillator to be returned to the supply of electrical energy.

While FIGURE 1 has shown three oscillating circuits all dependent on the same source of direct current P, it is also possible to employ independent sources of direct for each circuit. This arrangement is shown for example in FIGURES 3 and 4. In FIGURE 3 the coupling coils 011 and 021 are shown positioned in the collector circuit of a transistor. In FIGURE 4 the same coupling coils are shown in the emitter circuit of the transistor. In the case of both oscillating circuits, each is provided with an individual source of direct current P. It will be appreciated that instead of providing the disc-shaped screen D with a notch L, it is possible to insert in the screen a sector of ferromagnetic material or a magnetised material. When employing a disc-shaped screen provided with such a sector of magnetised material, it is possible to execute the contact free commutations in a manner such that upon passage of the magnetised sector between the windings there is provided in the latter a potential which may either further the production of oscillations, or delay said production.

The control of the operative condition of the oscillator need not be executed for the modification of its coupling and in fact, it can be obtained by any other known means by acting on a section of its control circuit. For instance, it is possible to provide inductively through a magnetised sector of the disc-shaped screen a control signal in the input circuit of the transistor. It is also possible for the screen to be a magnetic screen of a type well known per se. Regardless of the type of screen employed it is clear that by rotating the screen in proper position where the discontinuity L is in alignment with the windings, the magnetic flux or eddy currents are uninterrupted between the two windings and when a sector of the screen consisting of a metal that will interrupt the flux between the two windings is in alignment with the two windings, there is then no coupling between the transistor T1, for example, and the remainder of the circuit which is a feed-back loop circuit so that the transistor is not conductive and the oscillator circuit will not oscillate. When the flux links the windings, then the transistor T1 is rendered conductive and the oscillator circuit will oscillate for applying power or energising coil M1. Obviously, when the windings M1, M2, M3 are wound in a reversed direction over the poles P1, P2, P3, the direction of rotation of the motor is also reversed.

Evidently, the number of poles and/or phases in the energising windings can be selected as desired and it is limited in principle only by the overall allowed size of the motor. It is also possible as described to associate with each energising winding its own oscillator which energizes the corresponding winding once for each revolution, or else, in the case of a rotor carrying a suitable number of poles said energisation is obtained several times in accordance with the number of pairs of rotor poles. The screen is provided then with a number of notches or recesses which corresponds to said number of pairs of poles. Again, instead of fitting a common winding over two poles, it is obviously possible to make each rotor pole carry its own energizing winding.

Self-starting is therefore guaranteed if the motor is designed as a multiphase motor and if the phases are staggered with respect to one another in a suitable way. In that case each phase is controlled by an individual power stage with corresponding commutator circuit, as that described. Motors of this kind reliably start also under heavy load in a definite direction.

The second example according to the FIGURES 5–8 is also a motor with a three-phase stator, the excitation of which is controlled by the three commutators S1. Such a commutator is shown in FIGURES 9 and 10. Each of the three stator windings A1–B1, A2–B2, A3–B3 extends over an angle of approximately 180°, two windings overlapping over an angle of approximately 60° in each case.

The power stage assigned to each phase comprises a power transistor and a bias transistor. A control coil $n4$, $n5$ or $n6$, which is periodically excited with high frequency corresponding to the commutator motion by a constantly excited transmitter element (in this case the coils $n1$, $n2$ and $n3$) lies as the control element in the base circuit of the said bias transistor.

The control coils $n4$, $n5$ and $n6$ correspond to the coils $0^1$ to $0^3$ in the first example.

The transmiter coils $n1$, $n2$ and $n3$ are excited with high frequency across a transistor oscillator according to FIGURE 6. Between the coaxial coils $n1$, $n4$, and $n2$, $n5$ as well as $n3$, $n6$, there rotates the screening disc D (FIGURE 8), which is rigidly fastened to the rotor. Said screening disc has a recessed sector L as the control zone, which extends over approximately 120°.

In each rest position of the rotor and thus of the screening disc D at least one of the three stator windings according to FIGURE 7 is excited, that is to say, the stator winding which upon excitation can impart a torque to the motor. When the rotor and thus the disc D is rotating the control coils are consecutively excited by the commutator and thus the stator windings are excited in sequence across the corresponding power stages. Moreover each of the control coils $n4$, $n5$ and $n6$ according to FIGURES 5 and 7 is coupled with a resonant circuit, which is tuned to the frequency of the oscillator which feeds the transmitter coils. The coils $m4$, $m5$ and $m6$ belong to the resonant circuits. In this manner the signal induced in the control coils by the transmitter coils is substantially amplified on passing the recess of the conductive disc D.

According to FIGURE 6 the transmitter coils $n1$, $n2$ and $n3$ are in the collector circuit of a high-frequency oscillator (of the order of 100 kilocycles) and are coupled with the coils $m1$, $m2$ and $m3$ in the base circuit of the oscillator.

The D.C. voltage source feeding the motor according to FIGURE 6 may be the same source which also feeds the transistor oscillator according to FIGURE 6.

As FIGURE 7 shows, the coil pairs $n1$, $m1$ and $n2$, $m2$ as well as $n3$, $m3$ are suitably arranged concentrically with respect to one another on a common core 10. The coil pairs $n4$, $m4$ and $n5$, $m5$ as well as $n6$, $m6$ are arranged in an analogous manner in FIGURE 5.

Such a multi-pole motor, in which the number of poles naturally does not have to be limited to the specified number of 3, has the great advantage that high torques can be attained, since it is a known fact that the torque of a motor increases with the number of pairs of poles. While in conventional motors an increase in the number of pairs of poles is associated with a correspondingly complex structure of the collector which restricts the number of pairs of poles attainable in practice, a multi-pole motor according to the invention merely requires that the screening disc described above, which brings about the control of the excitation across a power stage, is provided with as many recesses and control zones as the motor has pairs of poles.

It will be seen that small electric motors operating without any contact can be provided having very light rotors adapted to revolve at very high speeds whilst by reason of the arrangement of the control members and in particular of the oscillating means subjected to the action of the screen, the operation is to a very large extent independent of the relative positions of the rotor and the stator and is largely independent of the structure of the stator. This motor has many uses, for example in the driving of many types of machine tools, in synchronising systems, for example, stroboscopic or cinematographic instruments, remote control systems for reproducing angular movements and ignition means for internal combustion engines. Since the drive obtained according to the invention is entirely free of sparking, the motor is useful in vicinities where explosions are liable to occur.

It will be appreciated that this commutatorless electric motor associates the advantages of a contact-free commutation with the production of a sufficiently strong and well-defined output signal for the periodic energising of the stator winding under the sole control of the relative position of a mechanical control member modifying inductively or capacitively the operative condition of the oscillator whilst it does not depend on the speed of the control member. Simultaneously this leads to the result that the structure of the stator of the motor may have a very simple design whilst the number of poles is not limited and the control members can be designed as desired independently of the structure of the stator.

It will be appreciated that electric motors according to the invention are self-starting since, regardless of the rest position of the motor and consequently of the screen D, the correct stator winding M is arranged to be energised by providing that at all positions of the screen D, one recess L registers to cut out the screening of the two coupling windings of one of the oscillators so that one of the windings M is energised and thus the rotor is moved in the normal manner.

It should be noted that the embodiment shown in FIGURE 1 and which comprises condensers C4 to C6 relates more specifically to motors of relatively low power in which transistors T1 to T3 play for each of the three respective phases simultaneously the role of angular position pickup and power commutator when they play the role of pickup they are coupled as oscillators by each of the windings 011–021 to 013–023. For the starting of the high-frequency oscillation as well as for avoiding interference, it is advisable not to pass high-frequency voltage in the windings of the motor. Accordingly, condensers C4 to C6 serve to uncouple the high-frequency oscillation with respect to the commutation frequency of the motor winding. These condensers are so dimensioned as to form a near short circuit for high-frequency voltage without appreciably attenuating the commutation frequency of the motor windings, which can occur easily. The frequency ratio between these can be very high, for example, 1000 to 1.

It will be understood that many variations and modifications of the herein claimed invention can be resorted to without thereby departing from the spirit and scope of the invention except as claimed below.

What is claimed is:

1. A D.C. electrodynamic driving system comprising, a rotor made of a magnetisable material, at least one periodically energised stator winding for developing a magnetic field for imparting a torquing effort to said rotor, an electronic amplifier circuit for periodically energising said winding comprising an amplifier and an electronic oscillator, having a source of D.C. current, a transistor, and a feedback coil connected to the base circuit of said transistor and forming therewith a feedback loop circuit, a screen effective to modify the operative conditions of said oscillator to render it oscillatory and nonoscillatory, said screen being mounted for rotation with said rotor, a magnetic circuit for coupling and uncoupling said amplifier and said oscillator in said feedback loop circuit and cooperative with said screen in controlling said oscillator and including an air gap, said screen being positionable in said gap in operation to vary the magnetic flux passing through said gap for periodically sequentially coupling and uncoupling said oscillator and said amplifier, to establish said feedback loop to said amplifier thereby to render said oscillator oscillatory and nonoscillatory periodically, said screen comprising a sector positionable in operation for allowing unimpeded flux linkage across said gap periodically to couple said amplifier and said oscillator to render said oscillator oscillatory.

2. A commutatorless electric motor as claimed in claim 1 wherein the oscillator is coupled inductively through a transformer having a magnetic circuit provided with a gap.

3. A commutatorless electric motor as claimed in claim 1 wherein a part of the screen is constituted by ferromagnetic material and is adapted to move into the gap at certain rotary positions of the rotor so as to break the magnetic coupling circuit of the transformer.

4. A commutatorless electric motor as claimed in claim 3 wherein the said part of the screen is magnetised.

5. A commutatorless electric motor as claimed in claim 1 wherein the oscillator is coupled capacitively and said screen modifies periodically the capacity of the coupling.

6. A commutatorless electric motor as claimed in claim 1 wherein the time constant of the oscillator delays the starting of the oscillations by a predetermined lapse of time.

7. A commutatorless electric motor as claimed in claim 1 wherein the oscillator is provided with a diode limiting the loading of the condenser forming part of the means defining the time constant.

8. A commutatorless electric motor as claimed in claim 1 wherein the stator is provided with a plurality of energizing windings each of which is fed through a corresponding oscillator, the operative conditions of the oscillators being modified in turn by a common screen so that the stator windings produce a rotary magnetic field.

9. A commutatorless electric motor as claimed in claim 1 wherein the rotor is magnetised diametrically and the stator is provided with three energising windings and with three poles spaced angularly apart at 120°, arranged symmetrically around said stator with two poles common to any one winding, the oscillators having coupling or control members also spaced angularly apart of 120°, the screen being capable of rotating coaxially with the rotor and having a recess adapted to allow an oscillator to be coupled and hence to energise its stator windings, this recess extending over an angle of approximately 120°.

10. A commutatorless motor as in claim 1 and having time constant means in said oscillator for delaying restarting of oscillations in said oscillator by a predetermined time lapse, said means comprising a capacitor and a diode connected to limit loading of said capacitor, said diode having a resistance in parallel therewith for giving the base of said transistor the bias voltage required for the self energizing of the oscillator.

References Cited

UNITED STATES PATENTS

| | | | |
|---|---|---|---|
| 2,986,684 | 5/1961 | Cluwen | 318—254 X |
| 3,050,671 | 8/1962 | Moller | 318—171 |
| 3,091,728 | 5/1963 | Hogan et al. | 318—254 X |
| 3,134,220 | 5/1964 | Meisner | 318—138 X |
| 3,175,140 | 3/1965 | Hogan et al. | 318—138 |
| 3,233,157 | 2/1966 | Stockman | 318—254 X |
| 3,239,739 | 3/1966 | Scholl | 318—138 |

ORIS L. RADER, *Primary Examiner.*

G. SIMMONS, *Assistant Examiner.*